(12) United States Patent
Pahwa et al.

(10) Patent No.: US 12,272,164 B2
(45) Date of Patent: Apr. 8, 2025

(54) AUTOMATED GUI-DRIVEN OpROM VALIDATION

(71) Applicant: Micron Technology, Inc., Boise, ID (US)

(72) Inventors: Shiva Pahwa, Bangalore (IN); Harsha Vardhana Gonchigara Vemanna, Bangalore (IN); Sathyashankara Bhat Muguli, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/235,149

(22) Filed: Aug. 17, 2023

(65) Prior Publication Data

US 2024/0070050 A1 Feb. 29, 2024

(30) Foreign Application Priority Data

Aug. 31, 2022 (IN) .............................. 202241049777

(51) Int. Cl.
| | | |
|---|---|---|
| *G06F 11/00* | (2006.01) | |
| *G06F 1/3225* | (2019.01) | |
| *G06F 11/22* | (2006.01) | |
| *G06F 11/27* | (2006.01) | |
| *G06V 30/16* | (2022.01) | |

(52) U.S. Cl.
CPC ............ *G06V 30/16* (2022.01); *G06F 1/3225* (2013.01); *G06F 11/2273* (2013.01); *G06F 11/2294* (2013.01); *G06F 11/27* (2013.01)

(58) Field of Classification Search
CPC ............. G06F 11/2273; G06F 11/2294; G06F 11/284; G06F 11/27; G06V 30/16
See application file for complete search history.

(56) References Cited

U.S. PATENT DOCUMENTS 9,405,656 B2 * 8/2016 Gillaspie .............. G06F 11/3664
9,792,195 B2 * 10/2017 Olsa ..................... G06F 11/3495
(Continued)

OTHER PUBLICATIONS

Mustapa, Muslim et al., Advanced UI test automation (AUTA) for BIOS validation using OpenCV and OCR, Sep. 2021, Indonesian Journal of Electrical Engineering and Computer Science (Year: 2021).*

*Primary Examiner* — Marc Duncan
(74) *Attorney, Agent, or Firm* — Schwegman Lundberg & Woessner, P.A.

(57) ABSTRACT

A method for performing automated GUI-driven OpROM validation starts with a processor executing an automated test script; and in response to executing the automated test script, the processor is caused to remotely accessing a memory sub-system using a web driver and an interface. The processor causes a BIOS terminal window of the memory sub-system to be displayed on a display screen. The processor captures a screenshot of the BIOS terminal window and generating an image based on the screenshot. The processor converts the image to text using OCR and generates an output comprising BIOS configuration details based on the text using a machine-learning algorithm. The processor then analyzes the output to validate the memory sub-system when no errors are detected in the output or to flag the memory sub-system when errors are detected in the output. Other embodiments are described herein.

20 Claims, 5 Drawing Sheets

(56) References Cited

U.S. PATENT DOCUMENTS

| 2012/0137180 | A1* | 5/2012 | Shao | G06F 11/0778 |
| | | | | 714/E11.029 |
| 2018/0210774 | A1* | 7/2018 | Young | G06F 11/0751 |
| 2020/0159647 | A1* | 5/2020 | Puszkiewicz | G06F 11/3664 |
| 2024/0362108 | A1* | 10/2024 | Zhang | G06F 11/1417 |

* cited by examiner

AUTOMATED GUI-DRIVEN OpROM VALIDATION

PRIORITY APPLICATION

This application claims the benefit of priority to Indian Patent Application Serial Number 202241049777, filed Aug. 31, 2022, which is incorporated herein by reference in its entirety.

TECHNICAL FIELD

Embodiments of the disclosure relate generally to memory sub-systems and more specifically to an automated GUI-Driven option ROM (OpROM) validation engine that can be implemented on remote test client in order to automatically perform OpROM validation of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE SEVERAL VIEWS OF THE DRAWINGS

The present disclosure will be understood more fully from the detailed description given below and from the accompanying drawings of various embodiments of the disclosure.

DETAILED DESCRIPTION

Prior to market release, engineering products need to be validated on various test systems by test engineers to ensure that the products meet quality needs. Further, for SSD products, there are several different chipsets that need to be qualified.

Currently, the OpROM validation requires that a BIOS validation engineer manually interacts with the user interface of a computer system (e.g., a test server) to ensure that the BIOS firmware or device driver is specification compliant and error free (e.g., OpROM validation). For example, the BIOS validation engineer manually checks for successful BIOS details displayed on the user interface like firmware version, reported driver version, device properties, driver status, after firmware update, etc. The test engineer thus monitors test cases as it progresses on a graphical display device for validation. This manual method of OpROM validation is time consuming, tedious, labor-intensive, expensive, and prone to human errors.

Aspects of the present disclosure are directed to a remote test client including an automated GUI-Driven option ROM (OpROM) validation engine that can automatically perform OpROM validation of a memory sub-system. Aspects of the present disclosure provide an improvement on the existing validation methods by automating the validation which increases test efficiency, consistency, coverage, and effectiveness. Further, the automated validation engine can run automated tests repeatedly at a lower cost with faster speed.

Figure 1:
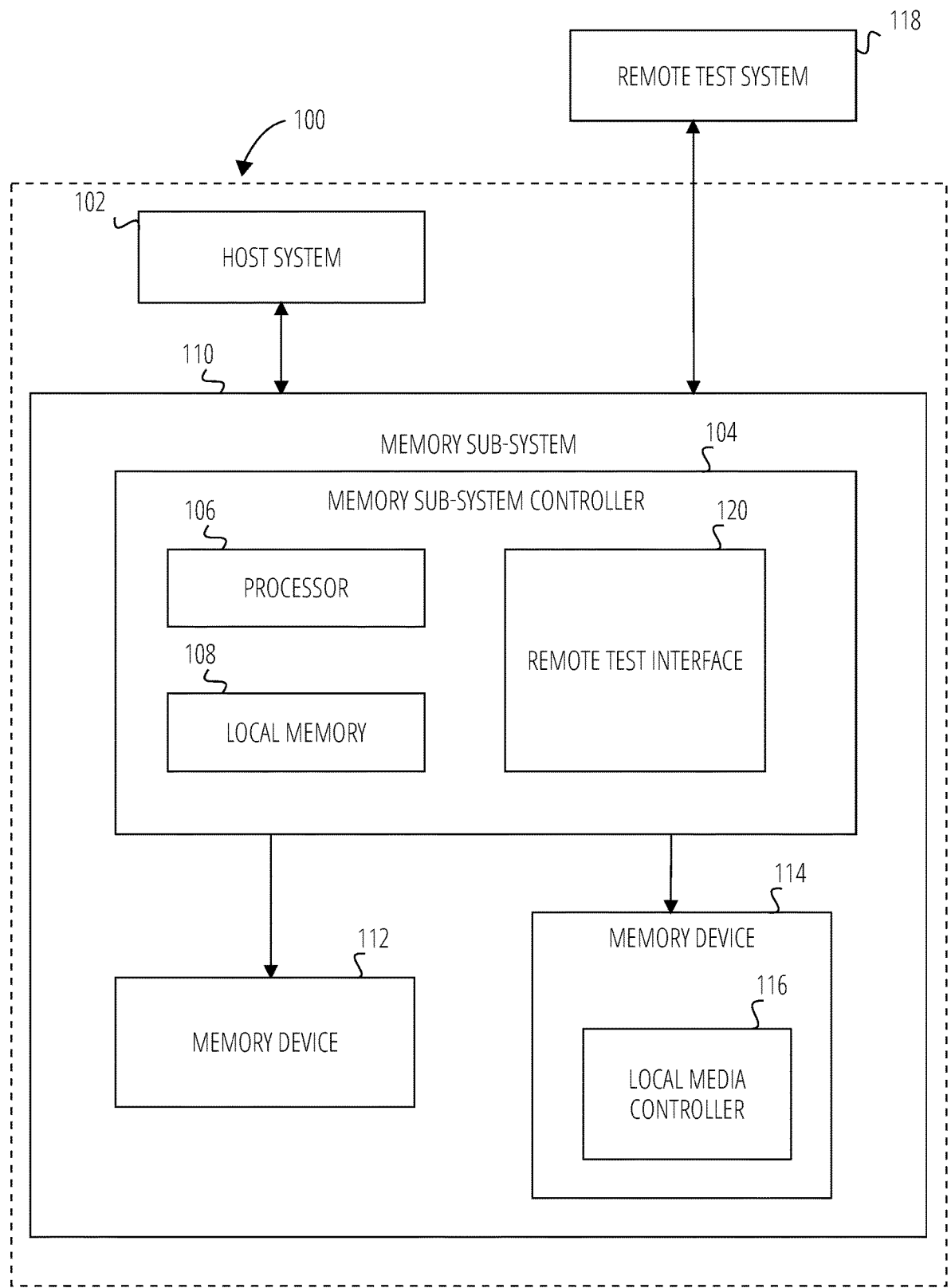
FIG. 1 is a block diagram illustrating an example remote test system and an example computing system that includes a memory sub-system, in accordance with some embodiments of the present disclosure.

FIG. 1 illustrates an example a remote test system 118 and a computing system 100 that includes a memory sub-system 110, in accordance with some embodiments of the present disclosure. The memory sub-system 110 can include media, such as one or more volatile memory devices (e.g., memory device 112), one or more non-volatile memory devices (e.g., memory device 114), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server (e.g., a test server), mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 110. In some embodiments, the host system 102 is coupled to different types of memory sub-system 110. FIG. 1 illustrates one example of a host system 102 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 110, for example, to write data to the memory sub-system 110 and read data from the memory sub-system 110.

The host system 102 can be coupled to the memory sub-system 110 via a host interface. Examples of a host interface include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 102 and the memory sub-system 110. The host system 102 can further utilize an NVM Express (NVMe) interface to access components (e.g., memory devices 114) when the memory sub-system 110 is coupled with the host system 102 by the PCIe interface. The host interface can provide an interface for passing control, address, data, and other signals between the memory sub-system 110 and the host system 102. FIG. 1 illustrates a memory sub-system 110 as an example. In general, the host system 102 can access multiple memory sub-systems via a same communication connection, multiple separate communication connections, and/or a combination of communication connections.

The memory devices 112, 114 can include any combination of the different types of non-volatile memory devices and/or volatile memory devices. The volatile memory devices (e.g., memory device 112) can be, but are not limited to, random access memory (RAM), such as dynamic random access memory (DRAM) and synchronous dynamic random access memory (SDRAM).

Some examples of non-volatile memory devices (e.g., memory device 114) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 114 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory device 114 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory device 114 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 114 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 114 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), holographic RAM (HRAM), NOR flash memory, and electrically erasable programmable read-only memory (EEPROM).

The memory sub-system controller 104 (or controller 104 for simplicity) can communicate with the memory devices 114 to perform operations such as reading data, writing data, or erasing data at the memory devices 114 and other such operations. The memory sub-system controller 104 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 106 (processing device) configured to execute instructions stored in a local memory 108. In the illustrated example, the local memory 108 of the memory sub-system controller 104 includes an embedded memory configured to store instructions for performing various processes, operations, logic flows, and routines that control operation of the memory sub-system 110, including handling communications between the memory sub-system 110 and the host system 102.

In some embodiments, the local memory 108 can include memory registers storing memory pointers, fetched data, and the like. The local memory 108 can also include ROM for storing micro-code. While the example memory sub-system 110 in FIG. 1 has been illustrated as including the memory sub-system controller 104, in another embodiment of the present disclosure, a memory sub-system 110 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 114 and/or the memory device 112. The memory sub-system controller 104 can be responsible for other operations such as wear-leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 114. The memory sub-system controller 104 can further include host interface circuitry to communicate with the host system 102 via the physical host interface. The host interface circuitry can convert the commands received from the host system 102 into command instructions to access the memory devices 114 and/or the memory device 112 and convert responses associated with the memory devices 114 and/or the memory device 112 into information for the host system 102.

In some embodiments, the memory devices 114 include local media controller 116 that operate in conjunction with memory sub-system controller 104 to execute operations on one or more memory cells of the memory devices 114 and 112.

The memory sub-system 110 also includes a remote test interface 120 that can include an interface that allows for remote access, monitoring, and control of the hardware of the computing system 100. For example, the remote test interface 120 can be Intelligent Platform Management Interface (IPMI). The remote test interface 120 provides an interface for hardware-based platform management systems. As shown in FIG. 1, the remote test interface 120 can provide an interface for the remote test system 118. Via the remote test interface 120, the remote test system 118 is able to monitor the hardware status (e.g., obtain temperatures, power consumption, voltage, etc.), log data, as well as accessing the computing system 100 (e.g., a test server) without running the operating system.

In some embodiments, the memory sub-system controller 104 includes at least a portion of the remote test interface 120. For example, the memory sub-system controller 104 can include a processor 106 (processing device) configured to execute instructions stored in local memory 108 for performing the operations described herein. In some embodiments, the remote test interface 120 is part of the host system 102, an application, or an operating system. In some embodiments, the local media controller 116 includes at least a portion of the remote test interface 120.

Figure 2:
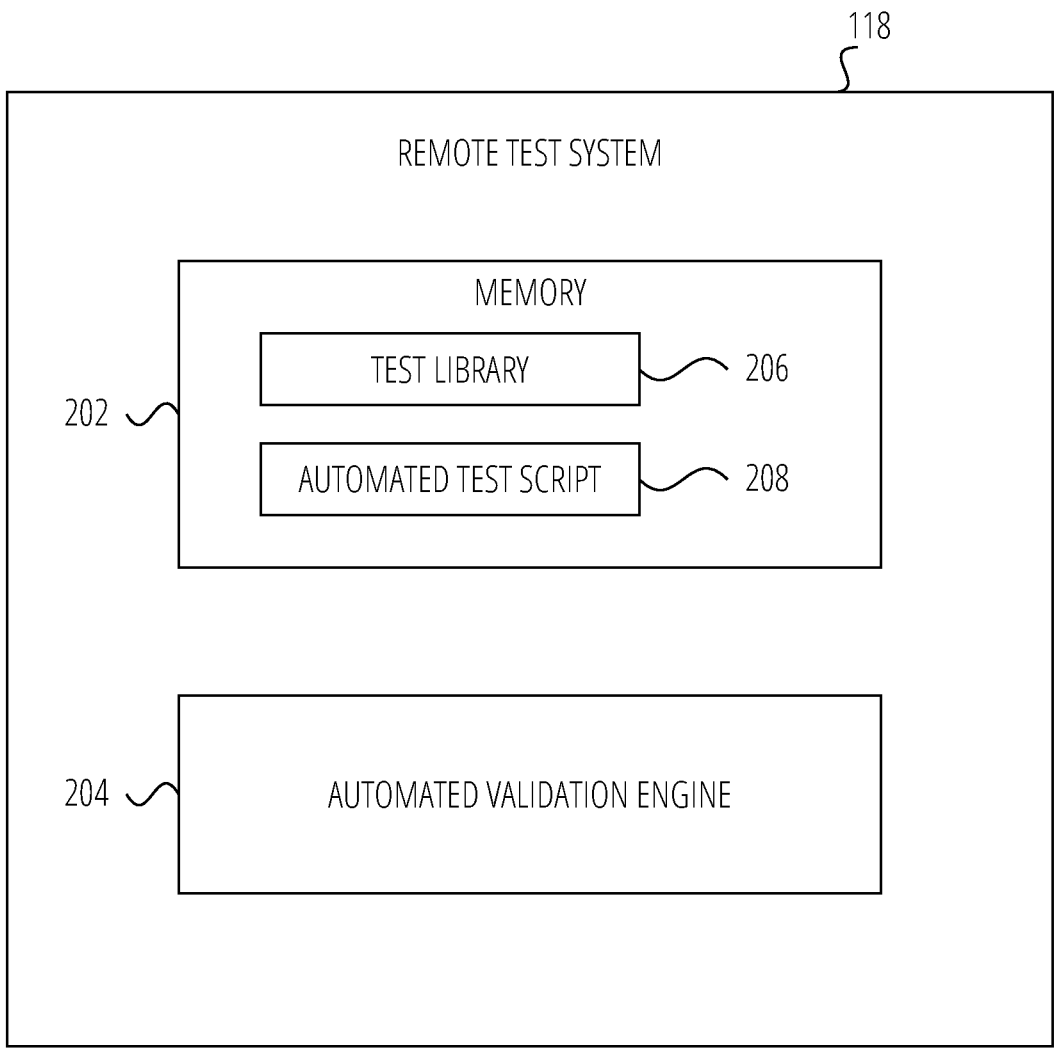
FIG. 2 is a block diagram illustrating an example of the components in remote test system in accordance with some embodiments of the present disclosure.

FIG. 2 is a block diagram illustrating an example of the components in remote test system 118 in accordance with some embodiments of the present disclosure.

As shown in FIG. 2, the remote test system 118 can include a memory 202 and an automated validation engine 204. The memory 202 can store instructions in an embedded memory for control operation of the automated validation engine 204. The memory 202 can store a test library 206 and automated test script 208. The automated validation engine 204 can include a processor or processing device that is configured to execute instructions stored in the memory 202. For example, the automated validation engine 204 can execute the automated test script 208 to cause the automated validation engine 204 to perform a process of automated GUI-Driven OpROM validation.

The test library 206 includes functions, tools, and modules that allow for the creation of the automated test script 208. While not shown, the automated validation engine 204 can further include a web driver that interacts with the remote test interface 120 (e.g., the IPMI web interface) to enable the automated validation engine 204 to perform power management of the server as well as navigate to the BIOS terminal window from the remote test system 118 to perform testing. Using keyboard command with the web driver, the automated validation engine 204 can navigate to the BIOS terminal window (or BIOS menu) and can also cause a screenshot of the BIOS terminal window being displayed to be captured and saved.

The test library 206 can include a programming function related to real-time computer vision which allows the automated validation engine 204 to capture and save the screenshot of the display of the computing system 100. The automated validation engine 204 or the test library 206 can also include an optical character recognition engine to convert a captured image (e.g., screenshot of the BIOS terminal window) to text using OCR.

The automated validation engine 204 can further generate, using a machine-learning algorithm, an output comprising BIOS configuration details based on the text obtained using OCR. The output can be a structured ordered representation of image to text (e.g., a JavaScript Object Notation (JSON) file). The automated validation engine 204 analyzes the output to validate the memory sub-system 110 when no errors are detected in the output, or to flag the memory sub-system 110 when errors are detected in the output.

Process of Performing Automated GUI-Driven OpROM Validation

Figure 3:
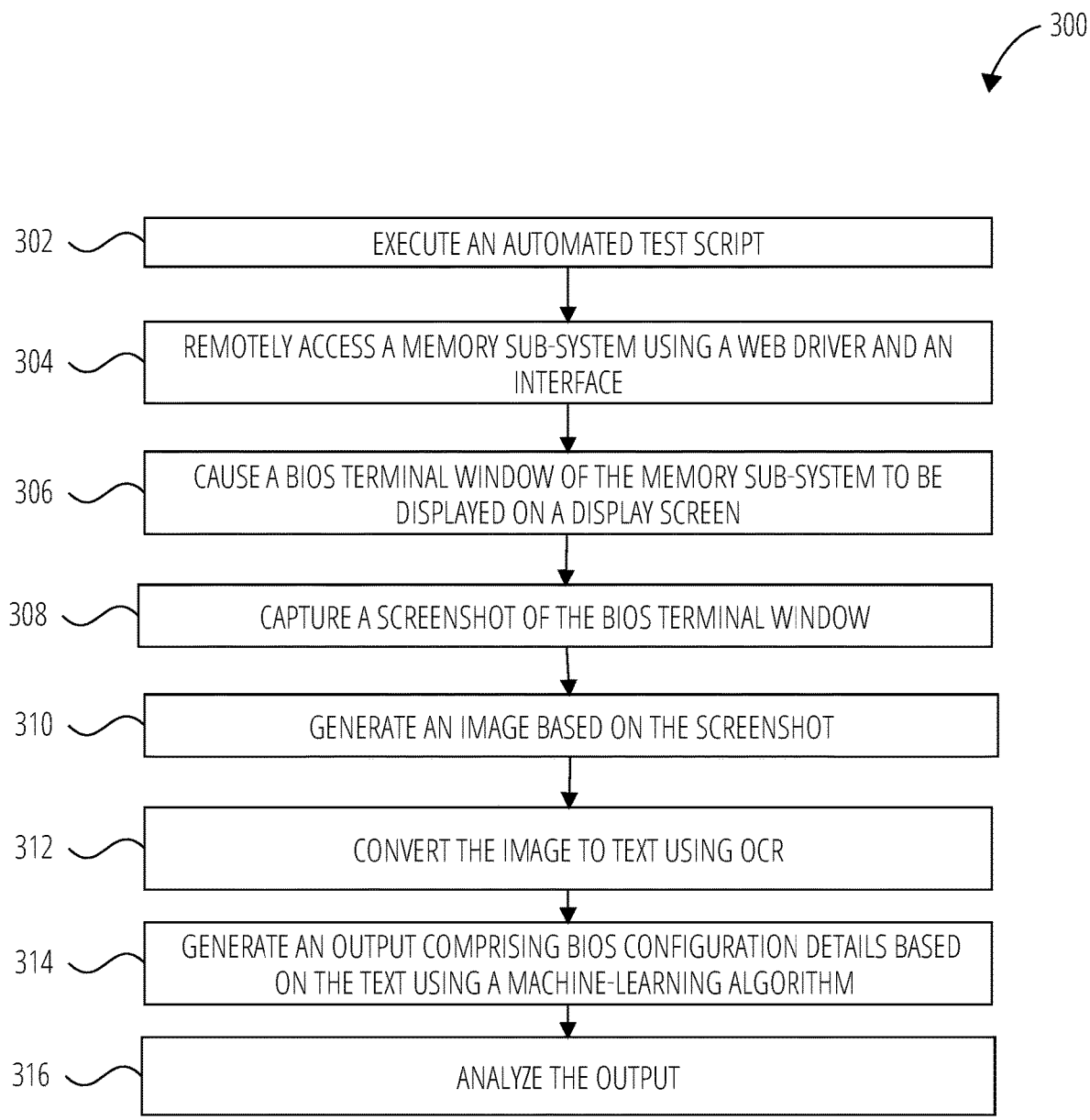
FIG. 3 illustrates a process 300 of performing an automated GUI-Driven OpROM validation in accordance with one embodiment.

FIG. 3 is a flow diagram illustrating a process 300 for performing automated GUI-driven OpROM validation, in accordance with some embodiments of the present disclosure. The process 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the process 300 is performed by the remote test system 118 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The process 300, in FIG. 3, starts at operation 302 with a processing device executing an automated test script 208. The automated test script 208 and a test library 206 can be stored in the memory 202 of the remote test system 118.

In response to executing the automated test script 208, the processing device is caused to perform operations 304 to 316 to automatically perform the validation of the memory sub-system 110 without human input.

At operation 304, the processing device remotely accesses a memory sub-system 110 using a web driver and an interface. In one example, the interface comprises an Intelligent Platform Management Interface (IPMI) interface (e.g., remote test interface 120). Via the interface, the processing device can perform power management in order to power on the memory sub-system 110.

The processing device, at operation 306, causes a basic input/output system (BIOS) terminal window of the memory sub-system 110 to be displayed on a display screen. The display screen can be the display of the host system 102 or a display of the memory sub-system 110. In one example, the processing device causes the BIOS terminal window to be display by navigating to the BIOS terminal window using a keyboard command.

The processing device captures a screenshot of the BIOS terminal window that is displayed on the display device using a keyboard command at operation 308. The processing device can save screenshot in an image format such as jpg format. At operation 310, the processing device generates an image based on the screenshot. Further details on the operation 310 in accordance with one embodiment are discussed with respect to FIG. 4.

Using optical character recognition (OCR) at operation 312, the processing device converts the image to text and, at operation 314, the processing device generates an output comprising BIOS configuration details based on the text. The processing device can use a machine-learning algorithm that decodes text into the output using data patterns and differentiates characters in a string using the data patterns. In order to generate the output, the processing device can further perform a dictionary word check on words in the output. For example, the dictionary word check includes validating that the output includes English words. The output is a structured ordered representation of the image to text. For example, the output can comprise JavaScript Object Notation (JSON).

At operation 316, the processing device analyzes the output to validate the memory sub-system when no errors are detected in the output, or to flag the memory sub-system when errors are detected in the output. Analyzing the output by the processing device can comprise conducting an Option ROM validation.

Figure 4:
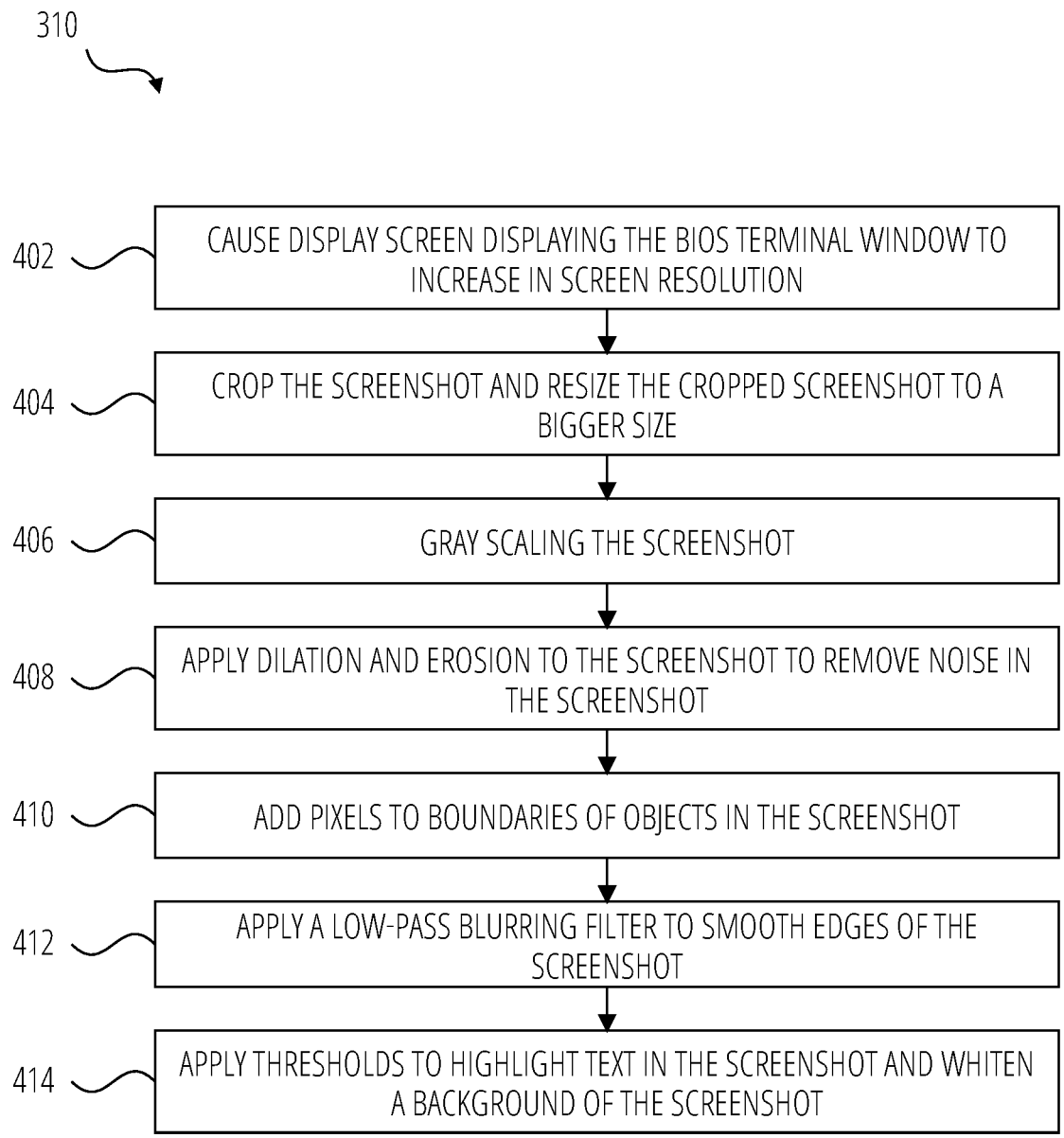
FIG. 4 illustrates a process of generating an image (operation 310) from process 300 in accordance with one embodiment.

FIG. 4 illustrates a process of generating an image (operation 310) from process 300 in accordance with one embodiment. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4, in order to generate the image based on the screenshot, the processing device causes the display screen displaying the BIOS terminal window to increase in screen resolution at operation 402. In another example, the processing device causes the display screen displaying the BIOS terminal window to increase in screen resolution prior to capturing the screenshot at operation 308 in FIG. 3.

At operation 404, the processing device crops the screenshot and resizes the cropped screenshot to a bigger size. The processing device can crop the screenshot to include the areas including text. Moreover, increasing the size of the cropped screenshot, the processing device effectively increases the text font in the cropped screenshot.

The processing device can further perform gray scaling of the screenshot at operation 406. Gray scaling includes converting an image from color spaces to different grey scale color. Accordingly, the screenshot is converted from color spaces to gray scale color.

At operation 408, the processing device applies dilation and erosion to the screenshot to remove noise in the screenshot, and at operation 410, adds pixels to boundaries of objects in the screenshot.

The processing device can apply a low pass blurring filter to smooth edges of the screenshot, at operation 412, and can then apply a plurality of thresholds to highlight text in the screenshot and whiten a background of the screenshot, at operation 414.

In some examples, the processing device can use the machine learning algorithm in order to identify the most optimal combination of operations 402 to 414 and sequence or order of operations 402 to 414 to obtain the highest accuracy data (e.g., the highest quality image that was generated based on the screenshot).

The remote test system 118 including an automated GUI-Driven option ROM (OpROM) validation engine that can automatically perform OpROM validation of a memory sub-system provides a number of improvements on the existing validation methods. The automation of the validation by the remote test system 118 ensures test efficiency, consistency, and effectiveness at a lower cost. OpROM validation limitations are overcome by reducing both the validation time and manual errors and further allows for mass testing on multiple server configurations. Additionally, the output generated by the automated validation engine 204 of the remote test system 118 includes the BIOS configuration details in structured ordered representation of image to text (e.g., JSON) which is user-friendly and storable and re-usable.

Examples

Described implementations of the subject matter can include one or more features, alone or in combination as illustrated below by way of example.

Example 1 is a remote test system comprising: a memory comprising an automated test script; and a processing device, operatively coupled with the memory, executing the automated test script to perform operations comprising: remotely accessing a memory sub-system using a web driver and an interface; causing a basic input/output system (BIOS) terminal window of the memory sub-system to be displayed on a display screen; capturing a screenshot of the BIOS terminal window; generating an image based on the screenshot; converting the image to text using optical character recognition (OCR), generating an output comprising BIOS configuration details based on the text using a machine-learning algorithm, and analyzing the output to validate the memory sub-system when no errors are detected in the output, or to flag the memory sub-system when errors are detected in the output.

Example 2 includes the remote test system of Example 1, wherein the interface comprises an Intelligent Platform Management Interface (IPMI) interface.

Example 3 includes the remote test system of Example 1, wherein the memory further comprising a test library.

Example 4 includes the remote test system of Example 1, wherein the processing device executing the automated test script to perform operations further comprising: performing power management to power on the memory sub-system.

Example 5 includes the remote test system of Example 1, wherein causing the BIOS terminal window to be displayed on the display screen further comprises: navigating to the BIOS terminal window using a keyboard command.

Example 6 includes the remote test system of Example 1, wherein capturing the screenshot of the BIOS terminal window comprises capturing the screenshot using a keyboard command.

Example 7 includes the remote test system of Example 1, wherein generating the image based on the screenshot further comprises: causing display screen displaying the BIOS terminal window to increase in screen resolution prior to capturing the screenshot.

Example 8 includes the remote test system of Example 1, wherein generating the image based on the screenshot further comprises: cropping the screenshot and resizing the cropped screenshot to a bigger size.

Example 9 includes the remote test system of Example 1, wherein generating the image based on the screenshot further comprises: gray scaling the screenshot.

Example 10 includes the remote test system of Example 1, wherein generating the image based on the screenshot further comprises: applying dilation and erosion to the screenshot to remove noise in the screenshot, and adding pixels to boundaries of objects in the screenshot.

Example 11 includes the remote test system of Example 1, wherein generating the image based on the screenshot further comprises: applying a low pass blurring filter to smooth edges of the screenshot.

Example 12 includes the remote test system of Example 1, wherein generating the image based on the screenshot further comprises: applying a plurality of thresholds to highlight text in the screenshot and whiten a background of the screenshot.

Example 13 includes the remote test system of Example 1, wherein the output is a structured ordered representation of the image to text.

Example 14 includes the remote test system of Example 1, wherein the output comprises JavaScript Object Notation (JSON).

Example 15 includes the remote test system of Example 1, wherein analyzing the output comprises conducting an Option ROM validation.

Example 16 includes the remote test system of Example 1, wherein the machine-learning algorithm decodes text into the output using a plurality of data patterns.

Example 17 includes the remote test system of any one of Example 1 or Example 16, wherein generating the output further comprises: differentiating characters in a string using the data patterns.

Example 18 includes the remote test system of Example 1, wherein generating the output further comprises: performing a dictionary word check on words in the output.

Example 19 is a method comprising: receiving, by a processing device, instructions from a host system using a buffer manager, wherein the instructions include a plurality of smaller-sized block write instructions; aggregating, using an aggregation engine, the smaller-sized block write instructions from the buffer manager into a plurality of larger-sized write instructions; and issuing a burst write instruction comprising the larger-sized write instructions to the memory component via the interface.

Example 20 is a non-transitory computer-readable storage medium comprising instructions that, when executed by a processing device, cause the processing device to perform operations comprising: receiving instructions from a host system using a buffer manager, wherein the instructions include a plurality of smaller-sized block write instructions; aggregating, using an aggregation engine, the smaller-sized block write instructions from the buffer manager into a plurality of larger-sized write instructions; and issuing a burst write instruction comprising the larger-sized write instructions to the memory component via the interface.

Example Computer System

Figure 5:
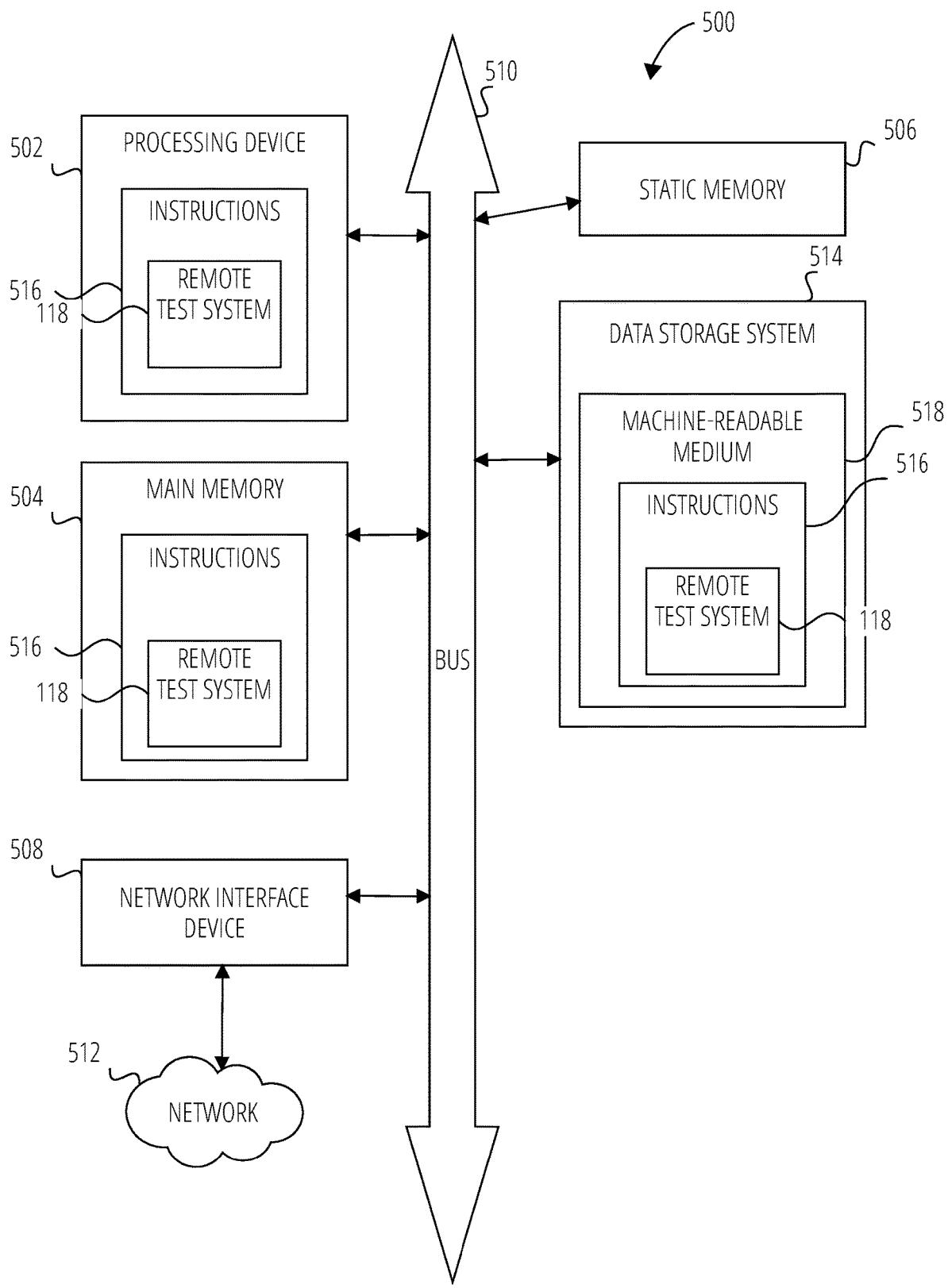
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a remote test system 118 of FIG. 1 or a host system (e.g., the host system 102 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the remote test system 118 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or RDRAM, etc.), a static memory 506 (e.g., flash memory, static random access memory (SRAM), etc.), and a data storage system 514, which communicate with each other via a bus 510.

Processing device 502 represents one or more general-purpose processing devices such as a microprocessor, a central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an ASIC, a FPGA, a digital signal processor (DSP), network processor, or the like. The processing device 502 is configured to execute instructions 516 for performing the operations and steps discussed herein. The computer system 500 can further include a network interface device 508 to communicate over a network 512.

The data storage system 514 can include a machine-readable storage machine-readable medium 518 (also known as a computer-readable medium) on which is stored one or more sets of instructions 516 or software embodying any one or more of the methodologies or functions described herein. The instructions 516 can also reside, completely or at least partially, within the main memory 504 and/or within the processing device 502 during execution thereof by the computer system 500, the main memory 504 and the processing device 502 also constituting machine-readable storage media. The machine-readable storage machine-readable medium 518, data storage system 514, and/or main memory 504 can correspond to the memory sub-system 110 of FIG. 1.

In one embodiment, the instructions 516 include instructions to implement functionality corresponding to performing automated GUI-driven OpROM validation (e.g., the remote test system 118 of FIG. 1). While the machine-readable storage machine-readable medium 518 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A test system comprising:
a memory device comprising an automated test script; and
a processing device, operatively coupled with the memory device, executing the automated test script to perform operations comprising:
remotely accessing a memory sub-system using a web driver and an interface;
causing a basic input/output system (BIOS) terminal window of the memory sub-system to be displayed on a display screen;
capturing a screenshot of the BIOS terminal window;
generating an image based on the screenshot;
converting the image to text using optical character recognition (OCR);
generating an output comprising BIOS configuration details based on the text using a machine-learning algorithm; and
analyzing the output to validate the memory sub-system when no errors are detected in the output, or to flag the memory sub-system when errors are detected in the output.

2. The test system of claim 1, wherein the interface comprises an Intelligent Platform Management Interface (IPMI) interface.

3. The test system of claim 1, wherein the memory device further comprising a test library.

4. The test system of claim 1, wherein the processing device executing the automated test script to perform operations further comprising:
performing power management to power on the memory sub-system.

5. The test system of claim 1, wherein causing the BIOS terminal window to be displayed on the display screen further comprises:
navigating to the BIOS terminal window using a keyboard command.

6. The test system of claim 1, wherein capturing the screenshot of the BIOS terminal window comprises capturing the screenshot using a keyboard command.

7. The test system of claim 1, wherein generating the image based on the screenshot further comprises:
causing display screen displaying the BIOS terminal window to increase in screen resolution prior to capturing the screenshot.

8. The test system of claim 1, wherein generating the image based on the screenshot further comprises:
cropping the screenshot and resizing the cropped screenshot to a bigger size.

9. The test system of claim 1, wherein generating the image based on the screenshot further comprises:
gray scaling the screenshot.

10. The test system of claim 1, wherein generating the image based on the screenshot further comprises:
applying dilation and erosion to the screenshot to remove noise in the screenshot, and
adding pixels to boundaries of objects in the screenshot.

11. The test system of claim 1, wherein generating the image based on the screenshot further comprises:
applying a low pass blurring filter to smooth edges of the screenshot.

12. The test system of claim 1, wherein generating the image based on the screenshot further comprises:
applying a plurality of thresholds to highlight text in the screenshot and whiten a background of the screenshot.

13. The test system of claim 1, wherein the output is a structured ordered representation of the image to text.

14. The test system of claim 1, wherein the output comprises JavaScript Object Notation (JSON).

15. The test system of claim 1, wherein analyzing the output comprises conducting an Option ROM validation.

16. The test system of claim 1, wherein the machine-learning algorithm decodes text into the output using a plurality of data patterns.

17. The test system of claim 16, wherein generating the output further comprises:
   differentiating characters in a string using the data patterns.

18. The test system of claim 1, wherein generating the output further comprises:
   performing a dictionary word check on words in the output.

19. A method comprising:
   executing, by a processing device, an automated test script; and
   in response to executing the automated test script, the processing device performing operations comprising:
   remotely accessing a memory sub-system using a web driver and an interface;
      causing a basic input/output system (BIOS) terminal window of the memory sub-system to be displayed on a display screen;
      capturing a screenshot of the BIOS terminal window;
      generating an image based on the screenshot;
      converting the image to text using optical character recognition (OCR);
      generating an output comprising BIOS configuration details based on the text using a machine-learning algorithm; and
      analyzing the output to validate the memory sub-system when no errors are detected in the output, or to flag the memory sub-system when errors are detected in the output.

20. A non-transitory computer-readable storage medium comprising instructions that, when executed by a processing device, cause the processing device to perform operations comprising:
   remotely accessing a memory sub-system using a web driver and an interface;
   causing a basic input/output system (BIOS) terminal window of the memory sub-system to be displayed on a display screen;
   capturing a screenshot of the BIOS terminal window;
   generating an image based on the screenshot;
   converting the image to text using optical character recognition (OCR);
   generating an output comprising BIOS configuration details based on the text using a machine-learning algorithm; and
   analyzing the output to validate the memory sub-system when no errors are detected in the output, or to flag the memory sub-system when errors are detected in the output.

* * * * *